No. 781,201.

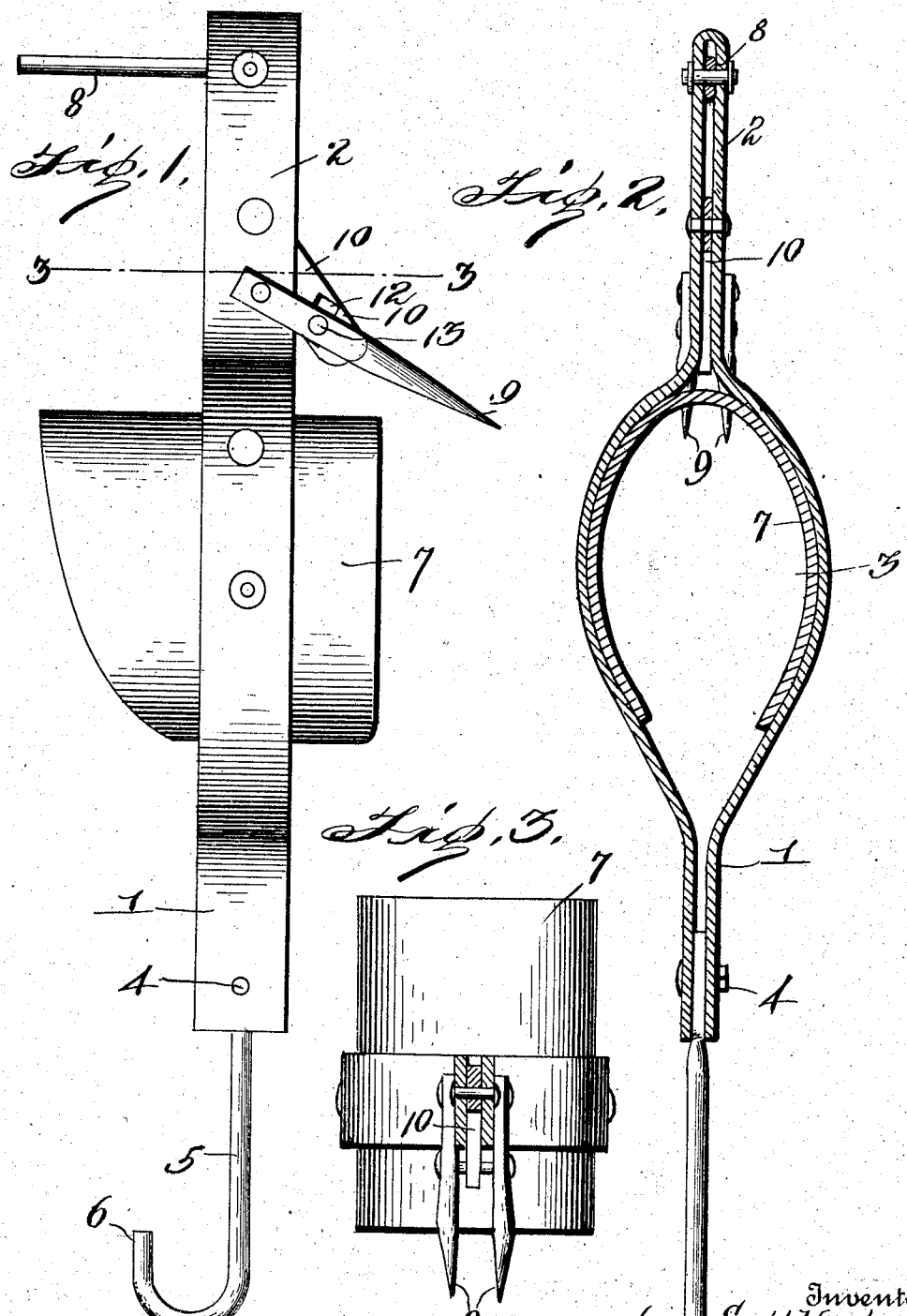

Patented January 31, 1905.

UNITED STATES PATENT OFFICE.

SCOTT HARTMAN, OF OSCEOLA, NEBRASKA.

ANIMAL-POKE.

SPECIFICATION forming part of Letters Patent No. 781,201, dated January 31, 1905.

Application filed August 4, 1904. Serial No. 219,498.

*To all whom it may concern:*

Be it known that I, SCOTT HARTMAN, a citizen of the United States, residing at Osceola, in the county of Polk and State of Nebraska, have invented certain new and useful Improvements in Animal-Pokes; and I do declare the following to be a full, clear, and exact description of the invention, such as will enable others skilled in the art to which it appertains to make and use the same.

This invention relates to improvements in animal-pokes.

The object of the invention is to provide a poke to be worn by animals to prevent their jumping over or climbing through and pushing down fences.

A further object is to provide a device of this character which will be simple in construction, strong and durable, and which may be conveniently worn by the animal and which will not interfere with the animal's eating.

With these and other objects in view the invention consists of certain novel features of construction, combination, and arrangement of parts, as will be hereinafter more fully described, and particularly pointed out in the appended claims.

In the accompanying drawings, Figure 1 is a side elevation of a poke constructed in accordance with the invention. Fig. 2 is a vertical longitudinal sectional view of the same, and Fig. 3 is a horizontal sectional view taken through the upper end of the same on the line 3 3 of Fig. 1.

Referring more particularly to the drawings, 1 denotes the frame of the poke, which is preferably formed of a single metal bar bent midway between its ends upon itself and bolted together to form an upper arm 2. Below said upper arm the ends of the bar are bent or curved outwardly to form a yoke 3, the ends being again brought together and bolted below said yoke portion by means of a bolt 4. Between said lower ends of the bars and secured by said bolt 4 is a depending pivoted rod or bar 5, the lower end of which is bent upwardly in the form of a hook 6.

Within the yoke portion 3 is arranged a guard-pad 7, which is formed of leather or other suitable material and is adapted to rest on the neck of the animal to protect the same from being chafed and galled by the movement of the yoke 3.

Between the upper ends of the fence-engaging arm 2 is fixedly secured a forwardly-projecting catch-arm 8. On the fence-engaging arm 2 immediately above the yoke portion 3 is pivotally connected a double-pointed prod or spur 9, the points of which project rearwardly and downwardly in a position to be engaged with the neck of the animal. Between the bars of the arm 2 above the pivotal point of the spur 9 is pivoted the upper end of a rearwardly-projecting inclined brace-bar 10, in the lower or outer end of which is formed an elongated aperture 12, through which is adapted to be passed a bolt 13. The ends of the bolt 13 are engaged with the prongs of the double-pointed spur 9. By this arrangement said spur is adapted to have a limited up-and-down pivotal movement, said movement being limited by engagement of the bolt 13 with the elongated aperture 12.

In applying the poke to the neck of the animal the bolt 4 is removed and the yoke portion of the poke sprung apart, thereby permitting the same to be arranged upon an animal's neck. The bolt 4 is now replaced and the lower ends of the bar thereby again connected together. Should the animal wearing the poke attempt to jump or tear down a fence, the catch-arm 8 or the hook-arm 6 will be engaged with the wires or rails of the fence, thereby forcing the poke back upon the neck of the animal and causing the points of the spur or prod to prick the animal's neck, thereby deterring him from further efforts to destroy or jump the fence. By pivoting the spur or prod 9 and permitting the same to have a limited swinging movement the points of the same will be gradually forced into the neck of the animal, which will warn him to cease his efforts without the necessity of producing as severe a wound as would be inflicted should said spur or prod be rigidly fixed to the arm of the poke.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. An animal-poke comprising a neck-yoke formed with rigid upper and lower extending arms, said upper arm having a rearwardly-projecting device provided with a stop-slot, a spur pivoted to said upper arm, extending rearwardly therefrom and having a stop device operating in said stop-slot, and a swinging arm attached to the lower arm of the yoke, substantially as described.

2. An animal-poke, consisting of a yoke adapted to engage the neck of the animal, a guard pad or band secured to the inner side of said yoke, an upwardly-projecting fence-engaging arm arranged above said yoke, a catch-arm fixed on and projecting forwardly from said fence-engaging arm, a swinging arm pivotally connected to the lower end of said yoke, the lower end of said arm having formed thereon an upwardly-projecting hook, a double-pointed prod or spur pivotally connected to said fence-engaging arm above said yoke, and a rearwardly-inclined brace-bar secured to said arm and having formed in its outer end an elongated aperture adapted to receive a bolt connecting the two points of said double-pointed spur, whereby the latter is adapted to have a limited pivotal movement on said fence-engaging arm, substantially as described.

In testimony whereof I have hereunto set my hand in presence of two subscribing witnesses.

SCOTT HARTMAN.

Witnesses:
 G. T. RAY,
 JAMES DUNN.